United States Patent
Smelov et al.

(10) Patent No.: US 8,447,266 B2
(45) Date of Patent: May 21, 2013

(54) METHOD FOR PROVIDING A SERVICE FOR MONITORING THE MOVEMENT OF SUBSCRIBERS AMONGST THE COVERAGE AREAS OF THE MOBILE CELLULAR COMMUNICATION NETWORKS AND A SYSTEM FOR CARRYING OUT SAID METHOD

(75) Inventors: Aleksey Vladislavovich Smelov, Novosibrisk (RU); Vitaliy Shamilovich Gumirov, Novosibirsk (RU)

(73) Assignee: Eyeline Communication CIS, LLC., Novosibirsk (RU)

(*) Notice: Subject to any disclaimer, the term of this patent is extended or adjusted under 35 U.S.C. 154(b) by 0 days.

(21) Appl. No.: 12/993,775

(22) PCT Filed: Dec. 12, 2008

(86) PCT No.: PCT/RU2008/000762
§ 371 (c)(1),
(2), (4) Date: Feb. 16, 2011

(87) PCT Pub. No.: WO2009/142534
PCT Pub. Date: Nov. 26, 2009

(65) Prior Publication Data
US 2011/0263247 A1 Oct. 27, 2011

(30) Foreign Application Priority Data

May 21, 2008 (RU) ................................ 2008120217
May 21, 2008 (RU) ................................ 2008120278

(51) Int. Cl.
*H04M 11/04* (2006.01)
(52) U.S. Cl.
USPC .................. 455/404.2; 455/404.1; 455/435.1; 455/432.1; 455/456.1

(58) Field of Classification Search
USPC .......... 455/404.1, 404.2, 414.1, 414.2, 414.3, 455/432.1, 435.1, 456.1, 456.3, 461
See application file for complete search history.

(56) References Cited

U.S. PATENT DOCUMENTS

| | | | |
|---|---|---|---|
| 7,383,043 B2 * | 6/2008 | Lee ............................... | 455/433 |
| 8,013,746 B2 * | 9/2011 | Kwon et al. ................ | 340/573.4 |
| 2002/0016173 A1 * | 2/2002 | Hunzinger .................... | 455/456 |
| 2002/0090943 A1 * | 7/2002 | Kwon ........................... | 455/433 |
| 2003/0110290 A1 * | 6/2003 | Hiyama et al. ................ | 709/242 |
| 2004/0224682 A1 * | 11/2004 | Kang ............................ | 455/433 |
| 2005/0255846 A1 * | 11/2005 | Shimbori ................... | 455/435.1 |

FOREIGN PATENT DOCUMENTS

| | | |
|---|---|---|
| RU | 2172494 C2 | 8/2001 |
| RU | 2314551 A1 | 1/2008 |
| WO | 9800988 A2 | 1/1998 |
| WO | WO 2004004369 A1 * | 1/2004 |

* cited by examiner

*Primary Examiner* — Jinsong Hu
*Assistant Examiner* — Magdi Elhag
(74) *Attorney, Agent, or Firm* — Paul & Paul

(57) ABSTRACT

Methods and system are provided for travelling subscribers of a mobile cellular communication networks (MCC) with a service for monitoring their movement in the coverage areas of the network and informing third persons about their movements. Travelling subscribers are provided a service for monitoring their movements between the MCC networks of GSM and UMTS standards, or between the segments of the networks, and for informing the recipients selected by the subscriber, or another authorized person, about the arrival of the subscriber. The service does not require modification or updating of the existing network infrastructure, or additional functionality for the infrastructure elements. Subscribers, upon their arrival at a new place, need not call relatives or send short SMS. The service is of particular value to the disabled.

9 Claims, 6 Drawing Sheets

United States Patent US 8,447,266 B2

Figure 1:
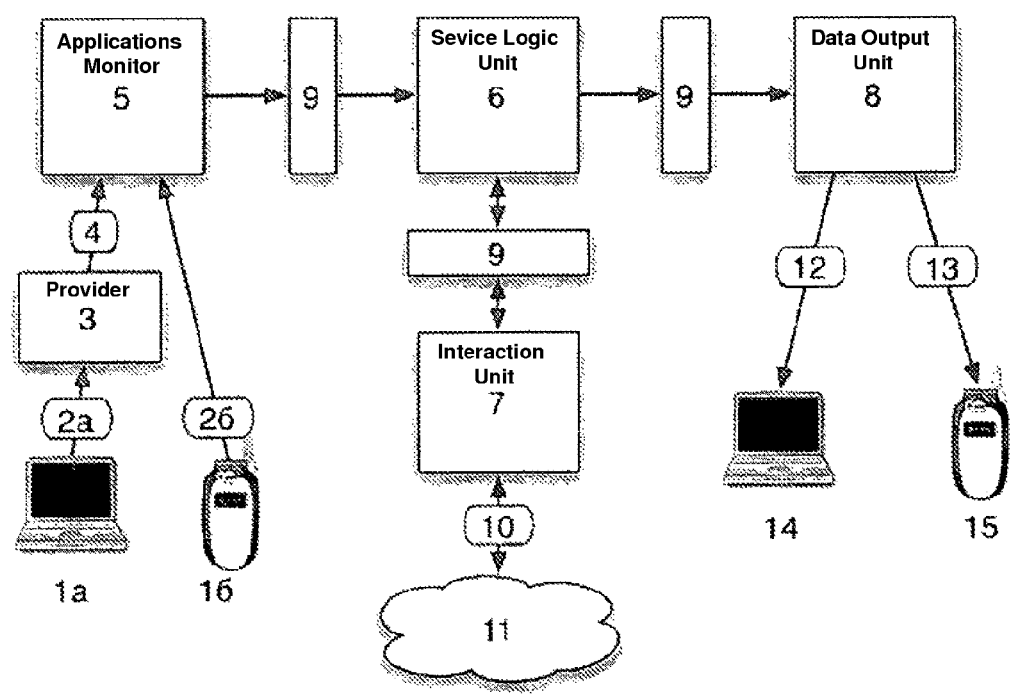

METHOD FOR PROVIDING A SERVICE FOR MONITORING THE MOVEMENT OF SUBSCRIBERS AMONGST THE COVERAGE AREAS OF THE MOBILE CELLULAR COMMUNICATION NETWORKS AND A SYSTEM FOR CARRYING OUT SAID METHOD

CROSS-REFERENCE TO RELATED APPLICATION

This national stage 371 application claims the priority of International Application No. PCT/RU2008/000762, filed Dec. 12, 2008, designating the United States, incorporated herein in its entirety by reference, which claims the priority of Russian serial No. 2008120278 dated May 21, 2008 and Russian Serial No. 2008120217 dated May 21, 2008.

The invention relates to methods and systems for providing additional services to subscribers of a mobile cellular communication network, in particular, to methods and systems allowing traveling subscribers to be provided with services for monitoring, if they wish so, their movements amongst the coverage areas of mobile cellular communication (MCC) networks and informing third persons about such movements.

Development and wide-scale use of mobile cellular communications have contributed to improvements in various aspects of human life and work. Traveling may be considered one of such illustrative examples. An MCC network subscriber arriving now by aircraft in another city or country may use his or her cellphone to inform his/her friends or workmates of his/her safe arrival. For this purpose, it is enough for him/her to have his/her telephone registered with one of the MCC networks operating in the area, whereupon he/she can easily make calls or send text messages.

This situation, however, is not without its limitations and drawbacks, particularly because mobile telephones are used normally by virtually all segments of the population, including persons with disabilities.

1. Time is needed to make a call or send a text message, but it is, as a rule, insufficient when a person has to pick up his/her baggage, leave the aircraft, find a customs control desk (if he/she arrived by an international flight), call a taxi to take him/her downtown, and so on, particularly if the person has disabilities.
2. Roaming voice calls and text messages are, as a rule, several times as expensive as common fixed home telephone rates. Considerable roaming communication expenses, at best, disappoint the users and, at worst, leave them without a communication device.
3. Even though writing text messages on a mobile telephone has been used extensively of late, it is still a considerable effort requiring high concentration and involving errors, and is practically impossible to perform by persons with disabilities.
4. Traditional types of mobile communication are frequently inaccessible or very difficult to use for disabled persons.

A prior art method and a system are known to be used to provide a service for monitoring location within a communication system (Russian Patent No. 2,314,551, IPC G01S 3/02, H04Q 7/38. Priority data: 02112321.7 2002.06.27 CN. Published: Jan. 10, 2008).

The prior art system comprises a center for identifying the location of movable objects (CILMO), a location identifying object (LIO), a mobile communication switching center (MCSC), a base station system, and a home location registry (HLR).

The prior art method is completed in three stages:

Stage 1, at which the center for identifying the location of movable objects (CILMO) receives a location identification request from another object through a signal transmission system 7 (SS7), or through the network of the Transmission Control Protocol/Internet Protocol (TCP/IP), confirms the identity of the subscriber;

Stage 2, at which the CILMO requests directly for the address of the switching center in the current subscriber roaming area from the home location registry (HLR) by sending requests to the short message service; and Stage 3, at which the CILMO interacts directly with the roaming area switching center, retrieves the information of the location identifying object (LIO) in the roaming area, interacts with the LIO in the roaming area, retrieves information about the current location of the subscriber, and returns the information received about the location to the requesting object.

The prior art method and system have the following drawbacks:

1. The method and system have been developed for networks with code division channels (CDMA) that are significantly less widespread than GSM/UMTS networks.
2. The method and system are capable of identifying the location of a subscriber at a certain time moment, but are not intended to formulate a notice specifically about registration of the subscriber's mobile terminal specifically in the designated coverage area.
3. The method and system are complicated because of interaction between the CILMO and the switching center and the LIO using nonstandard protocols to obtain the required information about the exact position of the subscriber, for which reason the system as a whole is more complicated and more expensive to produce.
4. The system requires several additional functions to be fulfilled by the switching center and the basic station subsystem to receive and transmit information about the location of a subscriber that are not used in the standard configuration of MCC networks.
5. The system does not allow the users to send information easily and simply to their relatives and friends about their arrival at destination.

These inventors set themselves the goal of developing a method and system for performing the method that allow additional services to be provided to subscribers of MCC networks in the GSM and UMTS standards, with their consent, for monitoring changes in the coverage areas of such subscribers in the MCC networks if such changes are related to air flight from one geographic locality to another, or by any other method of movement suggesting disconnection of a mobile terminal at the point of departure and connection thereof at the point of arrival. Besides, they permit a timely notice to be given to the user's relatives, friends or workmates (hereinafter "recipients") in advance by the subscriber or another person on the website of the service provider about the subscriber's arrival at destination.

This goal is achieved by using networks of the GSM and UMTS standards in the method for providing a service for monitoring the movement of subscribers between the coverage areas of mobile cellular communication (MCC) networks, said method comprising the following steps: (a) accepting an application for the service to be provided from the application initiator through the Internet on a specialized website, the SS7 signaling system using the SMS short message service, or the USSD supplementary service request protocol; (b) processing the application data and verifying the accuracy of the application parameters; (c) conducting monitoring; (d) processing the monitoring results; and (e) informing the recipients about the monitoring results. Moreover, verification of the application parameters includes verification of the subscriber's scheduled destination and time of arrival at destination that are to be indicated in the application. Monitoring is conducted in accordance with the schedule drawn up on the basis of the monitoring application data by sending a short SMS message to the subscriber's telephone number at a preset time; subsequently waiting for a message signal from the subscriber's home location registry containing confirmation of the subscriber's registration in the MCC network, and a subsequent request for the address of the current serving visiting location registry. In this case, a home database is used to obtain the name of the geographic place at the address of the current serving visiting location registry. As the monitoring results are processed, it is verified whether the scheduled destination named by the application initiator is identical to the name of the geographic place obtained as a result of monitoring, and whether the scheduled time of arrival indicated in the application is identical to the registration time of the subscriber's mobile terminal in the network. The recipients are informed about the monitoring results by using the SMS short message service, or the MMS multimedia message service, or the e-mail electronic mail service, or the HTTP hypertext transfer protocol. Moreover, an application with a request for the service to be provided is received through the Internet using a specialized website, or through the SMS short message service, or by using the USSD request. As the application is verified, it is verified whether the name of the destination, time of the subscriber's arrival at destination, and addresses of the recipients of the monitoring results are indicated correctly, and the subscriber's telephone number is verified by sending an SMS message with a test code at that number. If, during monitoring, the name of the geographic place received at the address of the current serving visiting location registry does not conform to the scheduled destination indicated by the application initiator, a short SMS message is sent to the subscriber to inform him/her about the unsuccessful monitoring attempt. The waiting time of a message signal from the subscriber's home location registry is limited during monitoring by a preset time out, and upon expiry of the waiting time of a message signal from the subscriber's home location registry, a short SMS message is sent to the subscriber to inform him/her about the unsuccessful monitoring attempt. After monitoring has been conducted and the recipients have been informed about the monitoring results, a short SMS message is sent to the subscriber together with a report on the delivery of notifications.

The system for providing a service for monitoring the movements of subscribers amongst the coverage areas of mobile cellular communication (MCC) networks comprises a unit to accept monitoring applications; a basic service logic unit; a unit interacting with the signaling network; and a monitoring data output unit. Furthermore, the application accepting unit comprises a monitoring request analyzer that can check the presence and accuracy of the subscriber's destination indicated and the time of his/her arrival at destination. The basic service logic unit comprises a monitoring instruction processor and a monitoring instruction database. The monitoring instruction processor and the monitoring instruction database make it possible to draw up and use a monitoring schedule and to start up the monitoring procedure at a specified time in accordance with the schedule. Besides, the basic service logic unit contains a territorial position database allowing conformity of the geographic place received from the address of the current serving visiting location registry to the geographic place indicated by the application initiator when the application is placed to be checked. The unit interacting with the signaling network has a monitoring instruction processor and an MAP interface module. The MAP interface module sends a short SMS message, activates the waiting flag in the home location registry, and receives a message signal from the home location registry that the subscriber's location has been updated to record the time of the object of monitoring registration in the new coverage area. The monitoring data output unit comprises a notification instruction processor, an MAP interface module, an SMPP interface module, an MM7 interface module, an SMTP interface module, and an HTTP interface module. The MAP interface module is used to inform the recipients about the monitoring results through the SMS short message service when the monitoring data output unit is connected immediately to the SS7 signaling network. The SMPP interface module serves to inform the recipients about the monitoring results through the SMS short message service when SMS messages are sent through a detached SMS center. The MM7 interface module serves to inform the recipients about the monitoring results through the MMS multimedia message service. The SMTP interface module serves to inform the recipients about the monitoring results through the e-mail electronic mail service. Finally, the HTTP interface module is used to inform the recipients about the monitoring results through the HTTP hypertext transfer protocol.

The technical effect of the claimed invention consists in that the claimed method and system for performing the same can be used to provide traveling subscribers of MCC networks with a service for monitoring their movements amongst MCC networks in the GSM and UMTS standards, or between segments of such networks, and notifying the recipients selected by the subscriber or another authorized person about the subscriber's arrival in a new location. This service, however, does not require any modification or improvement in the existing infrastructure of the MCC networks, or addition of any further functionality to the infrastructure elements. By conducting monitoring and notification automatically, this service will release subscribers each time upon arrival in a new location from the need to call, or send short SMS messages to, their relatives about their safe arrival. It is particularly important that this service allows disabled people to inform their relatives, without any undue inconveniences, about their safe arrival at destination.

The claimed method and system are illustrated in the accompanying drawings.

FIG. 1 shows diagrammatically a process for performing the claimed method with the use of the claimed system, wherein 1a is the personal computer of the application initiator; 1b is the mobile telephone of the application initiator; 2a is placement of the application by the initiator on a specialized website through the Internet; 2b is placement of the application by the initiator by an SMS or USSD request through the SS7 signaling network, wherein USSD is standardized, 3GPP TS 22.090, ETSI TS123 090, ETSI TS124 090, protocol of request for supplementary services in the mobile networks; 3 is a specialized website of the service provider; 4 is a request to the application acceptance unit through the SOAP protocol; 5 is the unit accepting monitoring applications; 6 is the basic service logic unit; 7 is the unit interacting with the signaling network; 8 is the monitoring data output unit; 9 is an inner data bus; 10 is interaction between the home location registry and the visiting location registries in the MAP protocol; 11 is the SS7 signaling network; 12 is delivery of a notification to the recipient by e-mail electronic mail or through the HTTP hypertext transfer protocol; 13 is delivery of a notification to the recipient through the SMS short message service or MMS multimedia message service; 14 is the personal computer of the recipient of the notification received by the e-mail electronic mail or through the HTTP hypertext transfer protocol; and 15 is the mobile telephone of the recipient of the notification received through the SMS short message service or the MMS multimedia message service.

Figure 2:
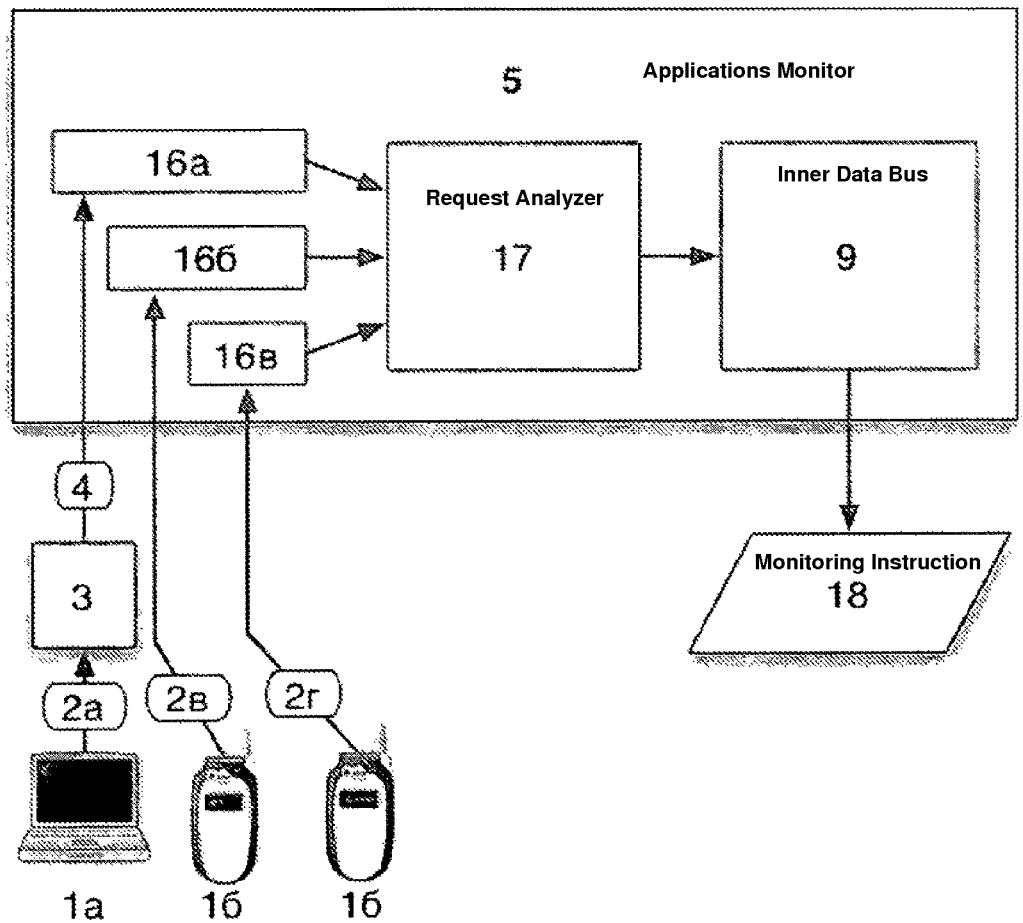

FIG. 2 shows diagrammatically acceptance of monitoring applications using application acceptance unit 5, wherein 16*a* is the SOAP interface module; 16*b* is the SMPP interface module; 16*c* is the MAP interface module; 17 is the request analyzer; and 18 is a request from the monitoring application acceptance unit to the basic service logic unit.

Figure 3:
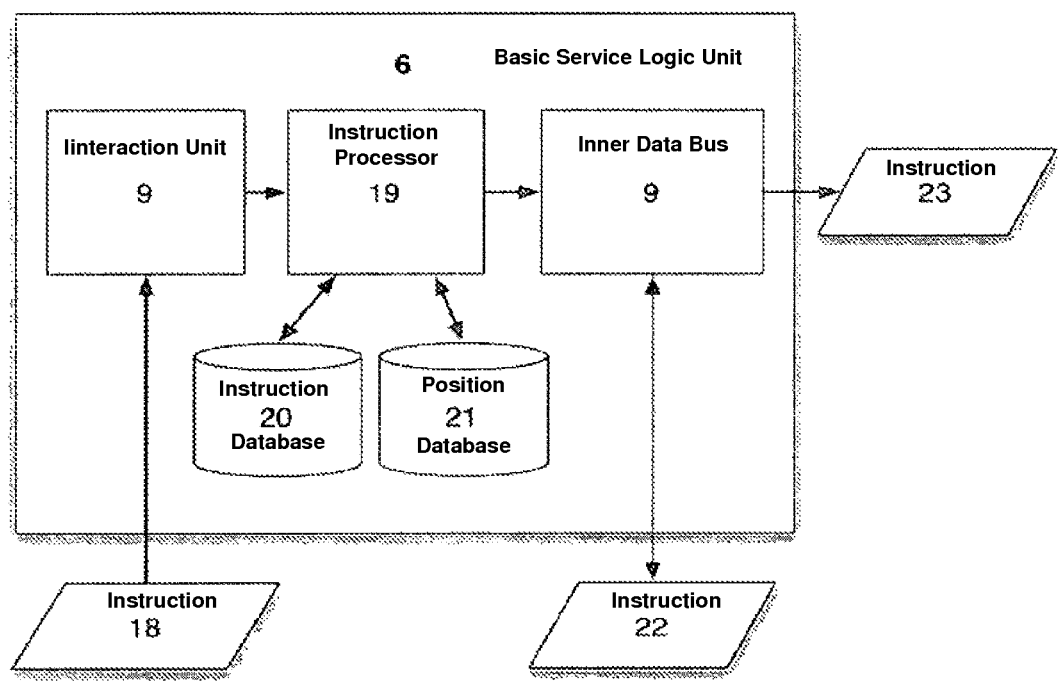

FIG. 3 shows diagrammatically interaction between the basic service logic unit and its environment, wherein 18 is a monitoring instruction from the monitoring application acceptance unit to the basic service logic unit; 19 is the monitoring instruction processor; 20 is the monitoring instruction database; 21 is the territorial position database; 22 is a monitoring instruction to the unit interacting with the signaling network; and 23 is an instruction to the monitoring data output unit to inform the recipients.

Figure 4:
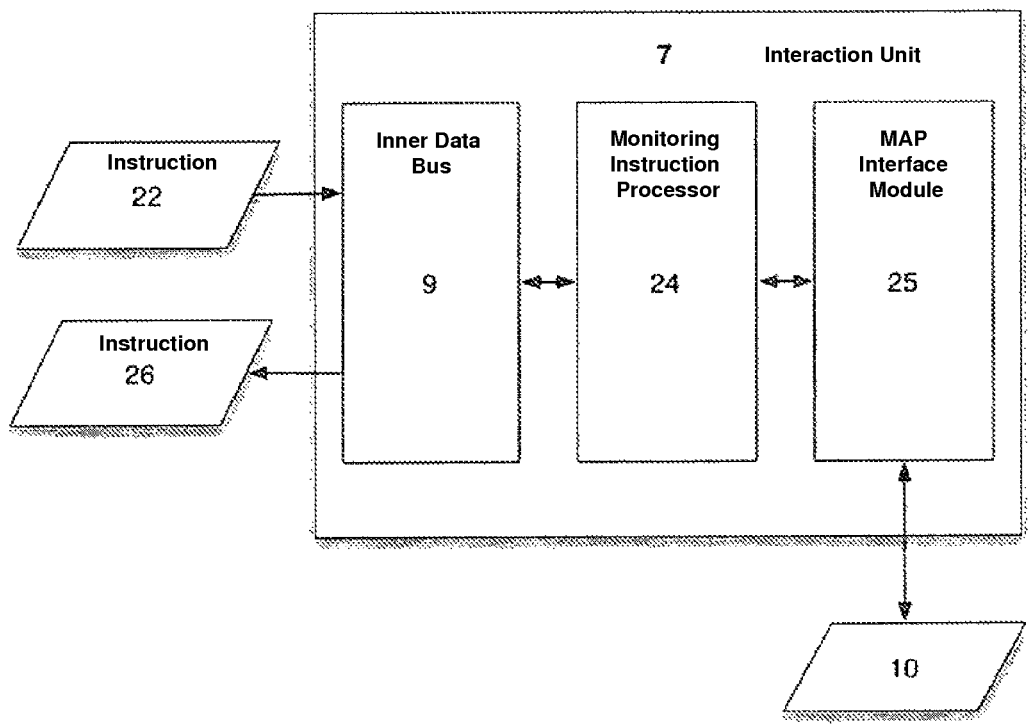

FIG. 4 shows diagrammatically operation of the unit interacting with the signaling network, wherein 24 is the monitoring instruction processor; 25 is the MAP interface module; and 26 is return of the instruction execution results.

Figure 5:
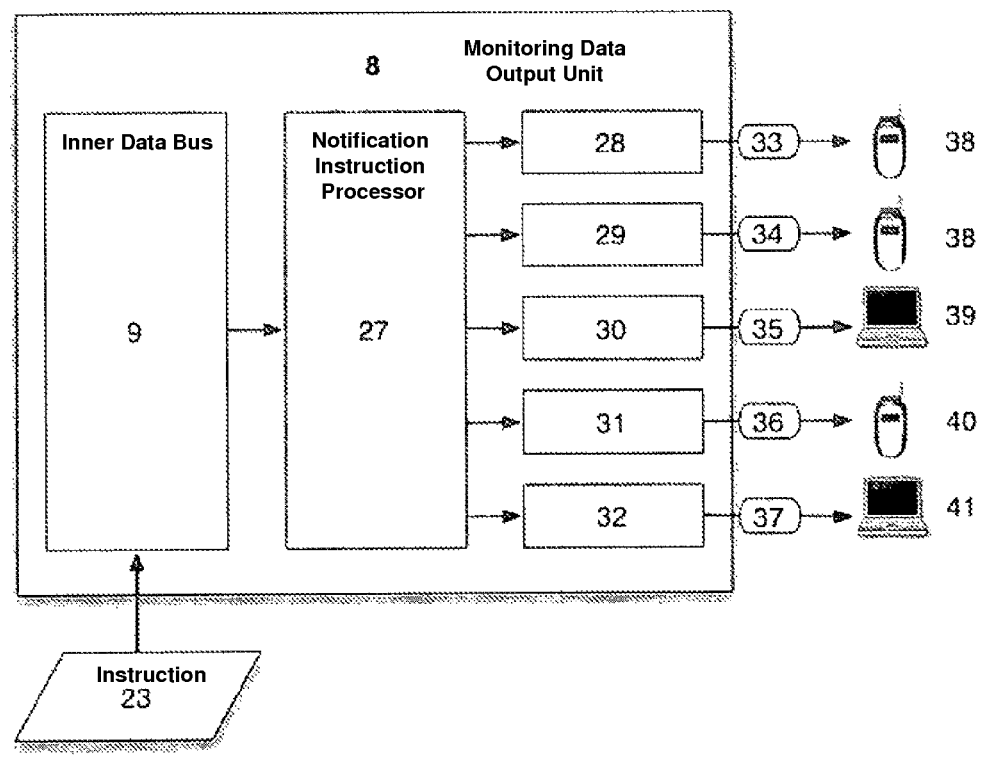

FIG. 5 shows diagrammatically the monitoring data output, wherein 27 is the notification instruction processor; 28 is the MAP interface module; 29 is the SMPP interface module; 30 is the SMTP interface module; 31 is the MM7 interface module; 32 is the HTTP interface module; 33 is delivery of a notification to the recipient through the SMS short message service in the event of direct connection to the SS7 signaling network; 34 is delivery of a notification to the recipient through the SMS short message service in the event of connection to an detached SMS center; 35 is delivery of a notification through the e-mail electronic mail service; 36 is delivery of a notification through the MMS multimedia message service; 37 is delivery of a notification through the HTTP hypertext transfer protocol; 38 is the mobile telephone of the recipient of the notification sent through the SMS short message service; 39 is the personal computer of the recipient of the notification sent through the e-mail electronic mail service; 40 is the mobile telephone of the recipient of the notification sent through the MMS multimedia message service; and 41 is the personal computer of the recipient of the notification sent through the HTTP hypertext transfer protocol.

Figure 6:
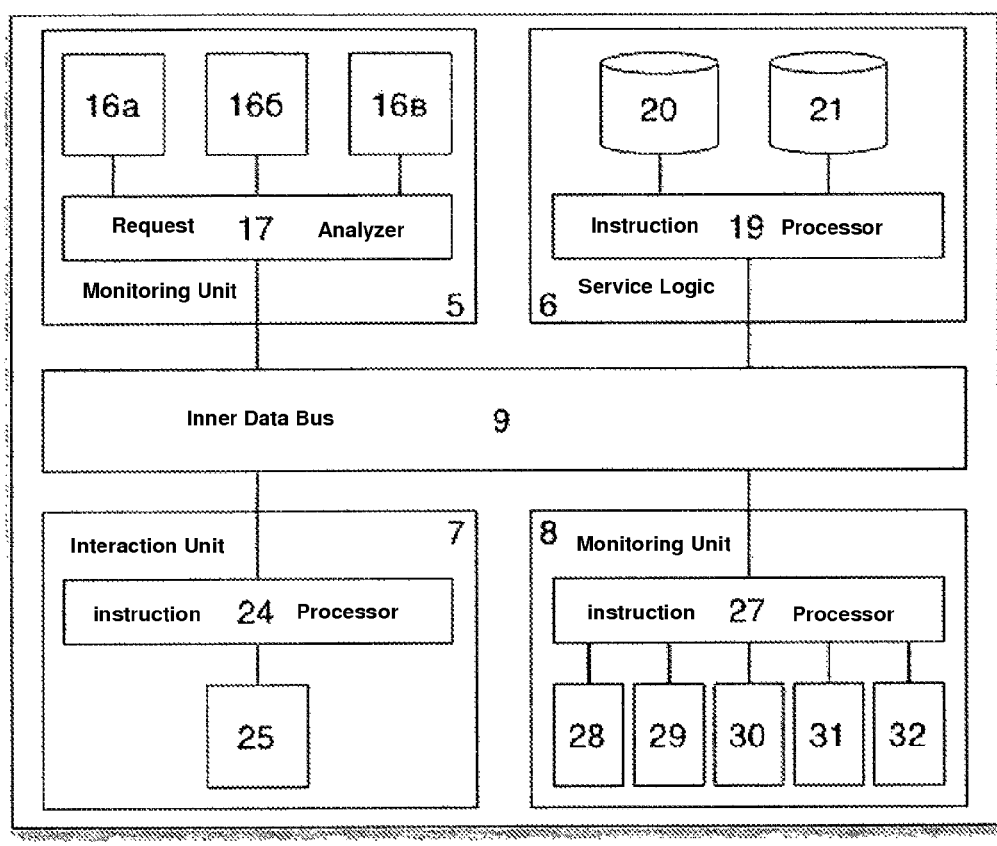

FIG. 6 is a block diagram of the system for providing a service for monitoring movements of subscribers amongst the coverage areas of mobile cellular communication networks.

The services provided for performing the claimed method and systems are designed essentially for subscribers of mobile cellular communication networks (MCC networks) who turn off their cellular telephones, for example, when traveling by air, during their travels.

The claimed method and system enable traveling subscribers of MCC networks to notify the recipients of their safe arrival at destination, wasting no time for calling or writing text messages, without apprehension of significant financial expenses required to make such calls and send such messages, and also offer additional opportunities to disabled persons.

The claimed invention is performed through the Internet public network and the HTTP hypertext transfer protocol, specialized, RFC 1.1, communication protocol used in the Internet for transferring hypertext pages; the SMS short message service, and the USSD protocol for requesting supplementary services for an initiator to place a monitoring application; through the SS7 signaling system, which is a standardized, ITU-T Q.700, set of telecommunications protocols used in a majority of telephone networks around the world for the tracking procedure; and the SMS short message service, the MMS multimedia service, the e-mail electronic mail service and the HTTP hypertext transfer protocol are used for informing the recipients about the tracking results.

In addition, the claimed system used in this invention comprises monitoring application acceptance unit 5 that accepts monitoring applications from subscribers or other persons, together with all essential accompanying data; basic service logic unit 6 that serves to draw up and subsequently meet the monitoring schedule, analyze the monitoring results, and issue instructions to other system units; a unit interacting with signaling system 7 to connect the entire system physically to the SS7 network, and effect interaction through the MAP (Mobile Application Part) protocol, standardized, 3GPP TS 29.002, a protocol for infrastructure elements of MCC networks to interact with certain units of mobile operator networks, in particular, HLR and VLR, essential for successful monitoring, wherein HLR is the home location registry storing information about all subscribers having a subscription with this operator, and VLR is the visiting location registry storing information about all subscribers (those of this operator and subscribers of other operators) who are provided with services in a specific coverage area of this operator at this time; and monitoring data output unit 8 that sends the monitoring results to the recipients.

The system is connected to the Internet public domain network using a stack of TCP/IP protocols (Transmission Control Protocol/Internet Protocol), a set of protocols to transmit data in public domain networks, developed by the Internet Engineering Task Force (IETF) and described by the standards RFC 793 (for TCP) and RFC 791 (for IP). The system is also connected to the signaling network connecting mobile communication operators through the SS7 signaling system.

The service is initiated by placing a monitoring application. Monitoring applications are accepted on specialized website 3 where the person placing the application (hereinafter the application initiator), who may be the subscriber himself/herself, or another interested person who has personal computer 1*a* connected to Internet 2*a* through a graphic interface, indicates the MSISDN, or Mobile Subscriber Integrated Services Digital Network number, standard, ITU-T E.164, telephone number of the mobile terminal (hereinafter the "monitoring object"), whose movements are to be tracked; destination (city or airport); and the scheduled time of arrival at destination. The application initiator also indicates the addresses of recipients, that is, numbers of mobile telephones, electronic mail addresses, or addresses of websites where notifications of monitoring results are to be sent. The application initiator is to give the address of at least one recipient. As an alternative, a monitoring application is placed by sending a short SMS message or USSD request 2*b* from mobile terminal 16 connected to the MCC network.

The application placed on specialized website 3 is transmitted to monitoring application acceptance unit 5 in the form of an SOAP protocol request 4, wherein SOAP stands for Simple Objects Access Protocol, a W3C protocol recommended for XML message exchange in data transfer networks. The request is further transferred through SOAP interface module 16*a* to request analyzer 17. An application sent from a mobile terminal through the SMS short message service or the USSD supplementary services request protocol is transmitted to the monitoring application acceptance unit in the form of a request in SMPP protocol 2c, if the monitoring application acceptance unit is connected to the short message center and to the USSD request acceptance center in the SMPP protocol, or in MAP protocol 2d, if the monitoring application acceptance unit is connected to SS7 signalization system directly. The request is then transmitted through SMPP interface module 16b or MAP interface module 16c to request analyzer 17.

Request analyzer 17 is used to verify the accuracy of the application. Verification includes at least checking the input accuracy of the MSISDN of the monitoring object and addresses of the recipients, and correct indication of destination and arrival time (for example, the arrival time is not to be in the past). If errors are detected in the application parameters, the application initiator is requested, through the website interface, to correct them or to revoke the application.

If the application is verified successfully, it is transmitted, through inner data bus 9, as monitoring instruction 18 to monitoring instruction processor 19 of basic service logic unit 6, the monitoring instruction being an internal system message in a special format. The monitoring instruction processor is used to reduce the time of arrival at destination given in the application to the internal system time, whereupon the instruction is placed, together with all the parameters given, in monitoring instruction database 20. The monitoring application remains in database 20 until the onset of the monitoring time that is fixed at a specified time (for example, 30 minutes) before the scheduled arrival of the monitoring object at destination.

When the monitoring time comes, the instruction is retrieved by basic service logic unit 6 from monitoring instruction database 20 and a monitoring instruction is formulated for the unit interacting with signaling network 7. The instruction is transferred through inner data bus 9. The MSISDN of the monitoring object is the sole instruction parameter.

To monitor the subscriber's arrival in a new coverage area, monitoring instruction processor 24 of the unit interacting with the signaling network formulates a short SMS message and sends it, through MAP interface module 25 via SS7 signaling network 11, to the MSISDN number of the mobile terminal, the monitoring object. When confirmation of the SMS message delivery is received from the current serving visiting location registry, the unit interacting with signaling network 7 sends a monitoring error message to basic service logic unit 6 as it is assumed that the monitoring object is to be out of the coverage areas of the mobile networks at that moment.

When a message is received from either the last serving visiting location registry or the home location registry that the monitoring object is associated with that the monitoring object is absent (Absent Subscriber message), the unit interacting with signaling network 7 sends a request to activate a waiting flag to the home location registry, using the MAP-REPORT-SM-DELIVERY-STATUS, an operation specified by ETSI TS129 002/3GPP TS 29.002. This operation informs the home location registry of the need for the unit interacting with the signaling network to be informed of the following factual registration of this mobile terminal in any of the visiting location registries:

Next, the input of MAP interface module 25 of the unit interacting with signaling network 7 awaits a message signal from the home location registry about the registration of the monitoring object in any visiting location registry, the message signal being a standard operation to inform the short message service center by the home location registry of the mobile subscriber about the presence of the mobile subscriber in the coverage area of any MCC network, MAP-ALERT-SERVICE-CENTRE, specified by ETSI TS129 002/3GPP TS 29.002.

On arrival at destination by air, the subscriber turns on his/her mobile terminal and registers it in one of the local mobile networks. At the registration time, the visiting location registry performs a Location Updating procedure, or change of the coverage area of the mobile subscriber, allowing the visiting location registry to inform the home location registry about registration of the mobile terminal concerned in its coverage area.

Upon receiving this information, the home location registry sends a message signal to the unit interacting with signaling network 7 that the coverage area of the monitoring object has been updated.

In this case, the unit interacting with signaling network 7 formulates and sends to the home location registry a request for the address of the serving visiting location registry, using the MAP-SEND-ROUTING-INFO-FOR-SM operation specified by ETSI TS129 002/3GPP TS 29.002. In response, the home location registry transmits the Global Title of the current serving visiting location registry to the unit interacting with the signaling network, Global Title being the address of the MCC network unit of a format described by the ITU-T E.164 recommendation.

When the required information has been received, the unit interacting with signaling network 7 transmits, through inner data bus 9, the global title of the current serving visiting location registry in the form of return of the execution results of instruction 26, and also the time when this information has been received, to basic service logic unit 6. Moreover, a short SMS message is not delivered to the mobile terminal, or the monitoring object.

After data have been received from the unit interacting with signaling network 7, monitoring instruction processor 19 of basic service logic block 6 is used to find a geographic equivalent in the home territorial position database 21 for the global title of the current serving visiting location registry. The name of a town, area, airport, and so on may be used as a geographic equivalent. If the name of a geographic place retrieved from the database is equivalent to the name of the geographic place given by the application initiator, this instruction is marked as executed in the monitoring instruction database of the basic service logic unit, and notification instruction 23 is formulated for monitoring data output unit 8 to inform the recipients. The instruction contains at least the following parameters:

MSISDN of the monitoring object:
Registration time of the monitoring object in the mobile network at destination;
Name of destination; and
List of addresses of the recipients.

Notification instruction processor 27 of monitoring data output unit 7 formulates, on the basis of information received from basic service logic unit 6, a respective notification message 33, 34, 35, 36, and 37 for each recipient about the arrival of the subscriber, or monitoring object, at a specified location. The notifications are then sent to telephone 38 and 40, or computer 39 and 41 of the recipient. Depending on the recipient's address given initially by the application initiator, different types of notification and different interface modules, respectively, are used.

MAP interface module 28 is used to deliver a notification to a recipient through the SMS, if the monitoring data output unit is connected directly to SS7 signaling network, MAP being a Mobile Application Part, standardized, 3GPP TS 29.002 protocol of interaction between infrastructure elements of MCC networks, or SMPP interface module 29, if the SMS message is delivered through an detached SMS message transmission center, SMPP being a Short Message Peer to Peer Protocol, specified, SMPP Developers Forum protocol of interaction between external applications and infrastructure elements of MCC operators.

MM7 interface module 31 is used to deliver a notification to a recipient through MMS, MM7 being a standardized, 3GPP TS 23.140, interface connecting the MMS multimedia message transmission center and outside systems.

SMTP interface module 30 is used to deliver a notification to a recipient by electronic mail (e-mail), SMTP being a specified, RFC 821, RFC 1123, protocol for transmitting electronic mail messages.

HTTP interface module 32 is used to deliver and place a notification on the website.

What is claimed is:

1. A method for providing a service for monitoring the movement of a subscriber to a respective subscriber's destination, the subscriber arriving at the destination at a specific time, amongst the coverage areas of mobile cellular communication (MCC) networks, comprising the steps of:
   (a) accepting an application, the application including application data and application parameters, from an initiator of the application for the monitoring service through the Internet using a specialized website, through the signal Transmission System 7 (SS7) using the short message service (SMS), or the Unstructured Supplementary Service Data (USSD) supplementary services request protocol;
   (b) processing the application data and verifying the accuracy of the application parameters;
   (c) conducting a monitoring service to provide monitoring results;
   (d) processing the monitoring results; and
   (e) informing the recipients about the monitoring results,
   wherein networks of Global System for Mobile Communication (GSM) and Universal Mobile Telecommunications System (UMTS) standards are used,
   wherein verification of the accuracy of the application parameters comprising:
   checking the presence of a subscriber's destination, time of the subscriber's arrival at the destination, the subscriber's telephone number, and a contact address of at least one recipient, and
   wherein monitoring comprising:
   determine a monitoring schedule on the basis of the application parameters;
   conducting the monitoring procedure at a specified time in accordance with the determined monitoring schedule;
   sending a short SMS message to the subscriber's telephone number at the specified time;
   awaiting subsequently a message signal from the subscriber's home location registry confirming the subscriber's registration in a new MCC network and then requesting for the address of the current serving visiting location registry associated with the new MCC network;
   using a home database to retrieve the name of the geographic location at the address of the current serving visiting location registry;
   verifying during the processing of the monitoring results whether the name of the scheduled subscriber's destination is identical to the name of the geographic place obtained as a result of monitoring, and whether the schedule time of arrival given in the application is identical to the registration time of the subscriber's mobile terminal in the new MCC network; and
   informing the at least one recipient about the monitoring results through the SMS short message service, or the MMS multimedia message service, or the e-mail electronic mail service, or the HTTP hypertext transfer protocol.

2. The method as claimed in claim 1, wherein an application for the service to be provided is accepted through the Internet using a specialized website, or through the SMS short message service, or by sending a USSD request.

3. The method as claimed in claim 1, wherein verification of the accuracy of the application comprises verification of the destination indicated, time given for the subscriber's arrival at destination, and addresses of the recipients to whom monitoring results are to be sent.

4. The method as claimed in claim 1, wherein verification of the accuracy of the application comprises verification of the accuracy of the subscriber's telephone number indicated by sending an SMS message with a test code at that address.

5. The method as claimed in claim 1, wherein a short SMS message is sent to the subscriber if the name of the geographic place received at the address of the current serving visiting location registry is not identical to the scheduled destination given by the application initiator to inform the subscriber about the unsuccessful monitoring attempt.

6. The method as claimed in claim 1, wherein the waiting time for the message signal from the subscriber's home location registry is limited to a preset time out.

7. The method as claimed in claim 6, wherein a short SMS message is sent to the subscriber upon expiry of the waiting time for the message signal from the subscriber's home location registry to inform the subscriber about the unsuccessful monitoring attempt.

8. The method as claimed in claim 1, wherein a short SMS message is sent to the subscriber after the recipients have been informed about the monitoring results, said short SMS message containing a report on the notifications sent.

9. A system for providing a service for monitoring the movements of subscribers to a respective subscriber's destination, the subscriber arriving at the subscriber's destination at a specific time, amongst the coverage areas of mobile cellular communication (MCC) networks and informing at least one recipient, comprising:
   a monitoring applications acceptance unit;
   a basic service logic unit;
   a unit interacting with a signaling network;
   and a monitoring data output unit,
   wherein:
   the application acceptance unit comprises:
   a monitoring request analyzer that verifies the presence and accuracy of the subscriber's destination, the time of the subscriber's arrival at the destination, the subscriber's telephone number, and a contact address of at least one recipient;
   the basic service logic unit comprises:
   a monitoring instruction processor and a monitoring instruction database to draw up and use a monitoring schedule and start up the monitoring procedure at a specified time in accordance therewith; and
   a territorial position database that verifies conformity of the address of the geographic place received from the current serving visiting location registry with the geographic place of the subscriber's destination;
   the unit interacting with the signaling network comprising:
   a monitoring instruction processor and Mobile Application Part (MAP) protocol interface module that uses operations of sending a short SMS message to the subscriber's telephone number, activating a waiting flag in the home location registry, and receiving a message signal from the home location registry on an update of the subscriber's location to mark the time of registration of the monitored subscriber in the coverage area of a new MCC network;

the monitoring data output unit comprising:

a notification instruction processor, a MAP interface module informing the at least one recipient about the monitoring results through the SMS short message service if the monitoring data output unit is connected directly to the SS7 signaling network; an SMPP interface module informing the recipients about the monitoring results through the SMS short message service if an SMS message is sent through an outside MSM SMS message transmission center; an MM7 interface module informing the recipients about the monitoring results through the MMS multimedia message service; and SMTP interface module informing the recipients about the monitoring results through the e-mail electronic mail service; and HTTP interface module informing the recipients about the monitoring results through the HTTP hypertext transfer protocol.

* * * * *